United States Patent [19]
Allin et al.

[11] Patent Number: 5,658,971
[45] Date of Patent: Aug. 19, 1997

[54] COATING COMPOSITION

[75] Inventors: Gaylord Allin, W. Monroe; Mark Gorham, Shreveport, both of La.

[73] Assignee: Dallas Enviro-Tek International, Inc., Dallas, Tex.

[21] Appl. No.: 455,130

[22] Filed: May 31, 1995

[51] Int. Cl.$^6$ ............... C08L 5/04; C08L 91/06; C08L 9/08

[52] U.S. Cl. .............. 524/28; 524/276; 524/277; 524/487

[58] Field of Search ............ 524/475, 474, 524/277, 28, 276, 487, 488, 489; 428/537.5

[56] References Cited

U.S. PATENT DOCUMENTS

| | | | |
|---|---|---|---|
| 2,548,802 | 4/1951 | Linscott | 260/85.1 |
| 2,637,095 | 5/1953 | Mersereau | 28/80 |
| 3,085,026 | 4/1963 | Weisgerber et al. | |
| 3,308,006 | 3/1967 | Kresse et al. | |
| 3,481,889 | 12/1969 | Gibser | 260/17.4 |
| 3,523,058 | 8/1970 | Shick | 161/133 |
| 3,791,856 | 2/1974 | Duling | 427/359 |
| 4,117,199 | 9/1978 | Gotoh et al. | 428/486 |
| 4,129,542 | 12/1978 | Matheson et al. | 260/28.5 |
| 4,315,830 | 2/1982 | French et al. | 252/182 |
| 4,386,965 | 6/1983 | Fringeli et al. | 106/214 |
| 4,556,603 | 12/1985 | Thorsrud | 428/283 |
| 4,569,968 | 2/1986 | Uffner et al. | 525/54.5 |
| 4,576,987 | 3/1986 | Crockatt et al. | 524/487 |
| 4,681,910 | 7/1987 | Crockatt et al. | |
| 5,126,390 | 6/1992 | Duff | |
| 5,232,987 | 8/1993 | Sakakibara et al. | 525/98 |
| 5,308,896 | 5/1994 | Hansen et al. | 524/13 |
| 5,336,712 | 8/1994 | Austgen, Jr. et al. | 524/530 |
| 5,362,573 | 11/1994 | Pandian et al. | 428/511 |
| 5,447,977 | 9/1995 | Hansen et al. | 524/13 |

*Primary Examiner*—Peter A. Szekely
*Attorney, Agent, or Firm*—Baker & Botts, L.L.P.

[57] ABSTRACT

An aqueous coating composition adapted for coating the bottom layer of a double-faced liner board, the composition containing a carboxylated styrene-butadiene copolymer and wax with an aqueous solution of an alkali metal alginate as an optional ingredient.

9 Claims, No Drawings

COATING COMPOSITION

The present invention relates to an aqueous coating composition comprising of (1) a latex of a styrene-butadiene copolymer or a carboxylated styrene-butadiene copolymer and (2) wax particles.

BACKGROUND OF THE INVENTION

It is desirable to provide an aqueous composition for coating a substrate, the composition forming a water resistant coating that is glueable and printable.

It is desired that the bottom layer of a double-faced liner board be easily coated with an aqueous coating that can be readily adapted to high speed production, the resultant coating being waterproof, recyclable and glueable.

OBJECTS OF THE INVENTION

It is an object of the present invention to provide an aqueous composition that forms a waterproof coating on a substrate, the composition comprising (1) about 10 to 85 weight percent of a latex of a styrene-butadiene copolymer or a carboxylated styrene-butadiene copolymer and about 90 to 10 weight percent of wax.

It is an object of the present invention to provide an aqueous coating composition comprising the following ingredients in approximate percentages by weight:

| Ingredients | % by Weight |
| --- | --- |
| Styrene-butadiene copolymer | 70 |
| Sodium Alginate | 20 |
| Carnauba Wax | 5 |
| Polyethylene | 5, | the composition having a pH of about 8.5 to 9 and a viscosity of about 12–13 seconds (#3 Zahn).

These and other objects will be apparent from the specification that follows and the appended claims.

SUMMARY OF THE INVENTION

The present invention provides an aqueous coating composition comprising up to about 85 percent by weight of (A) a latex of a styrene-butadiene copolymer or a latex of a carboxylated styrene-butadiene copolymer and (B) wax.

The present invention also provides an aqueous coating composition comprising about 60 to 80 percent by weight of (A) a latex of a styrene-butadiene copolymer or a latex of a carboxylated styrene-butadiene copolymer and (B) about 20 to 40 percent by weight of wax, there also being about 10 to 30 percent by weight of an aqueous solution of an alkali metal alginate. The above composition also advantageously contains about 1 to 10 percent by weight of a carnauba wax and/or 1 to 10 percent by weight of polyethylene.

The invention also provides a method of coating a substrate by applying to substrate an aqueous coating composition comprising up to about 85 percent by weight of (A) a latex of a styrene-butadiene copolymer or a latex of a carboxylated styrene-butadiene copolymer and (B) wax.

DETAILED DESCRIPTION OF THE INVENTION

The composition is easily applied to a substrate such as a liner board. The composition can be applied rapidly and the resultant coating formed merely by heating the composition to about 110° F. to 180° F. or above to form the waterproof coating.

The composition can be used advantageously as a bottom coating of a bottom layer of a double-faced liner board, the composition being waterproof and being recyclable in contrast to wax coatings.

The thickness of the coating is generally about 0.2 t0 30 mils and preferably about 1 to 5 mils.

The coatings are measured for waterproof qualities by standard ASTM tests and TAPP tests including the Cobb test. A lower Cobb value such as 10 to 30 is generally preferred.

The amounts of the copolymer in the composition is generally about 30 to 85 percent by weight, preferably about 70 to 75 percent by weight, and optimally, about 68 to 72 percent by weight.

The amount of butadiene in the copolymer is generally about 25 to 40 percent by weight and preferably about 30 to 35 percent by weight. The optimum amount is generally about 32–33 percent by weight.

The pre-polymer or the carboxylated pre-polymer can be cured or crosslinked with, for instance, crosslinking agents such as acrylamides including N-methanol acrylamide.

A suitable pre-polymer of a styrene-butadiene copolymer is sold by Rhone-Poulenc, Specialty Chemical Division under the product name: WRL 706S1.

A suitable carboxylated Styrene-butadiene latex is sold by Reichhold as Tylac™ Resin Emulsion 97422-02.

In general, the carboxylated copolymer is made by reaction with an-unsaturated carboxylic acid such as maleic acid or methacrylic acid.

The alkali metal alginate is preferably sodium alginate although potassium and lithium can be used as the alkali metal.

The polyethylene is a liquid (non-solid) low molecular polyethylene having a molecular weight of 2500 or lower—say 1000 or so. Chem Coy 260 can be used.

The liquid carnauba wax helps give the resultant coating body and the wax is commercially available. A liquid emulsion of wax, including polyethylene wax, can be used in addition to the alginate or polyethylene as minor additives.

EXAMPLE 1

An aqueous coating composition was prepared by mixing the following ingredients in approximate percent by:

| Ingredient | % by Weight |
| --- | --- |
| Styrene-butadiene copolymer (33% by weight butadiene emulsion - curable) | 70 |
| Sodium Alginate | 20 |
| Carnauba Wax | 5 |
| Polyethylene | 5, | the resulting composition had a pH of about 8.5 to 9 and a viscosity of about 12–13 (#3 Zahn).

The composition was applied to a liner board substrate to form, when heated, a waterproof coating. The coating was recyclable.

EXAMPLE 2

A composition was made as in Example 1 except that a carboxylated styrene-butadiene (33% butadiene) copolymer was used instead of the styrene-butadiene copolymer.

Substantially equivalent results were obtained.

The Gotoh et al. U.S. Pat. No. 4,117,199 discloses, at its main thrust, a coating composition containing a styrene-methylmethacrylate copolymer latex and a wax emulsion to provide a low water vapor permeability, a low degree of defibering and a high degree of water resistance. Example 15, apparently to show a less desirable coating composition, discloses a mixture of a styrene (35% styrene) butadiene copolymer latex—100 parts by weight and 13 parts by weight of wax emulsion. The skilled person would be led away from an aqueous composition containing 85% by weight of a styrene-butadiene copolymer and a 15 percent by weight of a wax emulsion (with sodium alginate), because. Example 15 shows poor water vapor permeability and poor defibering compound compared to the superior main thrust butadiene-methyl methacrylate copolymer/wax composition.

What is claimed is:

1. An aqueous coating composition comprising from about 10 weight percent up to about 85 percent by weight of (A) a latex of a curable styrene-butadiene copolymer or a latex of a curable carboxylated styrene-butadiene copolymer, (B) wax and (C) about 10 to 30 percent by weight of an aqueous solution of an alkali metal alginate; wherein the aqueous coating composition is adapted for forming a water resistant coating.

2. A composition as defined in claim 1 in which there is about 10 to 85 percent by weight of a latex of a styrene-butadiene copolymer or a latex of a carboxylated styrene-butadiene copolymer and about 85 to 15 percent by weight of wax.

3. A composition as defined in claim 1 in which there is about 60 to 80 percent by weight of a latex of a styrene-butadiene copolymer or a latex of a carboxylated styrene-butadiene copolymer and about 20 to 40 percent by weight of wax.

4. A composition as defined in claim 1 in which there is about 1 to 10 percent by weight of carnauba wax.

5. A composition as defined in claim 1 in which there is about 1 to 10 percent by weight of polyethylene.

6. An aqueous coating composition comprising the following ingredients in approximate percentages by weight:

| Ingredients | % by Weight |
| --- | --- |
| Styrene-butadiene copolymer latex | 70 |
| Sodium Alginate | 26 |
| Carnauba Wax | 5 |
| Liquid Polyethylene | 5 | the composition having a pH of about 8.5 to 9 and a viscosity of about 12–13 seconds (#3 Zahn).

7. An aqueous coating composition comprising up to abut 85 percent by weight of (A) a latex of a curable styrene-butadiene copolymer or a latex of a curable carboxylated styrene-butadiene copolymer, (B) wax, and (C) about 10 to 30 percent by weight of an aqueous solution of an alkali metal alginate.

8. A composition as defined in claim 7 in which the alkali metal is sodium or potassium.

9. A composition as defined in claim 8 in which the alkali metal is sodium.

\* \* \* \* \*